July 25, 1967 G. K. BURKE 3,332,439
FLOW REGULATING APPARATUS
Filed Aug. 18, 1965
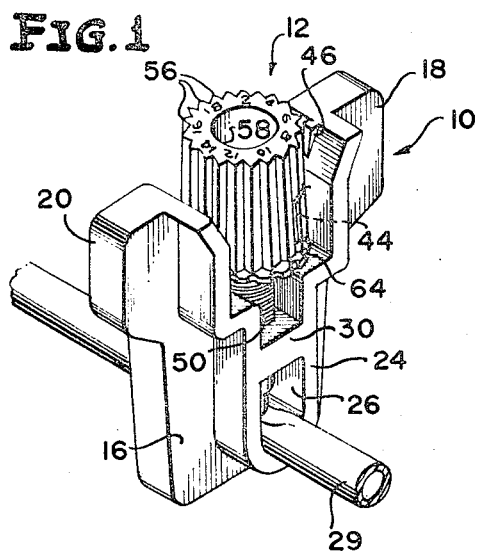
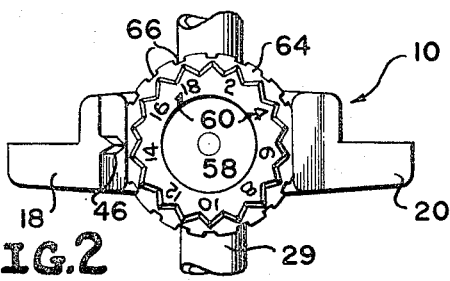
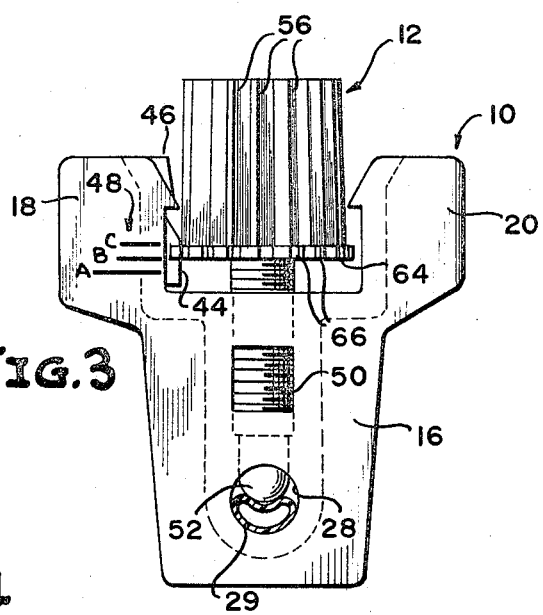
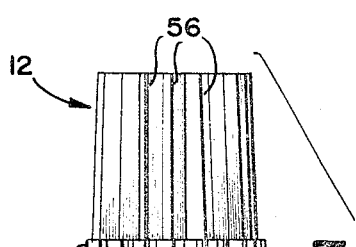
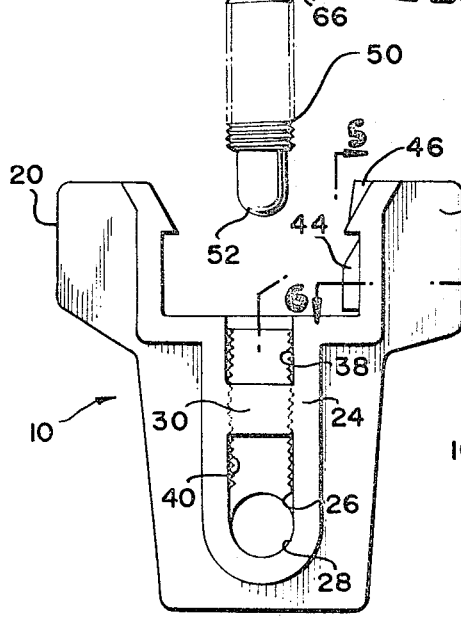
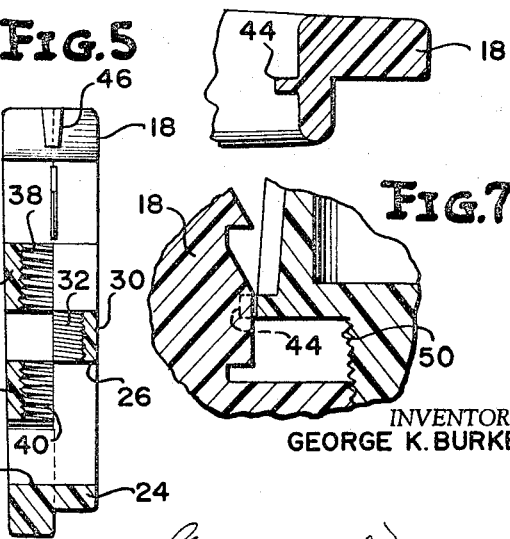
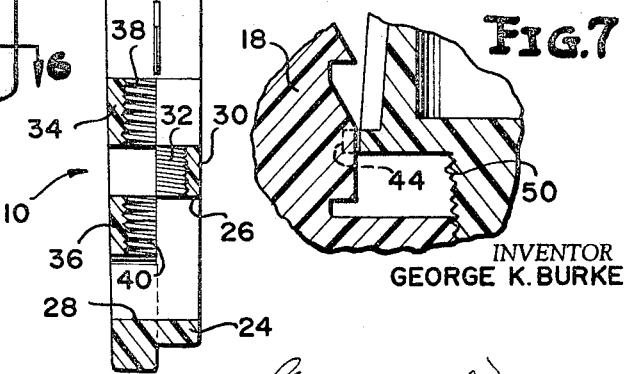
INVENTOR
GEORGE K. BURKE
BY Shoemaker and Mattare
ATTORNEYS United States Patent Office 3,332,439
Patented July 25, 1967

3,332,439
FLOW REGULATING APPARATUS
George K. Burke, Bethlehem, Pa., assignor to Burron Medical Products, Inc., Bethlehem, Pa., a corporation of Pennsylvania
Filed Aug. 18, 1965, Ser. No. 480,625
5 Claims. (Cl. 137—556)

The present invention relates to new and novel flow regulating apparatus, and more particularly to apparatus which is especially adapted for use with flexible tubular members to control liquid flow therethrough.

In certain applications such as when giving intravenous injections to patients in hospitals and the like, it is necessary to provide flow regulating apparatus in association with the tubular conduit means conducting the intravenous fluid which is adapted to control the rate of flow through the conduit means.

It is apparent that in many instances as where blood or a special fluid is being fed into the bloodstream of a patient, it is necessary to very accurately control the rate of flow of liquid in order to avoid an improper rate of flow which may result in serious consequences to the patient.

In many situations, the desired rate of flow for a particular solution is well recognized. This rate of flow may vary as for example according to the age of blood which is being fed into the bloodstream, or various other factors may enter into this consideration. It is accordingly a principal feature of the present invention to provide means which enables the flow rate through an associated flexible tubular member to be accurately adjusted and further to permit such flow rate to be adjusted in certain incremental steps.

After the apparatus has been set in a desired operative position, it is also important to provide a means for positively maintaining the apparatus in this adjusted position thereby preventing accidental displacement of the adjustment which obviously can create very undesirable end results. The present invention accordingly employs an arrangement wherein the operating means which comprises the movable portion of the adjusting apparatus may be positively locked in operative position to prevent such accidental displacement, and yet which at the same time permits the operating means to be moved to a new setting when so desired without requiring an excessive amount of manual effort.

The arrangement of the present invention also enables a nurse to readily detect whether or not the flow regulating apparatus has been tampered with to determine whether any changes have been made in the desired setting. The apparatus further enables resetting thereof to a previous setting from any position without recalibrating the drop rate for a desired flow rate thereby saving a considerable amount of time.

The indexing means of the present invention is particularly designed to provide an audible clicking as the operating means of the apparatus is turned with respect to the body means so that a person utilizing the apparatus can feel or hear the indexing movement whereby accurate indexing of the apparatus may be obtained even where the visible indicating means is not readily seen as may be the case for example when the lighting is poor or under other circumstances.

The present invention also incorporates a unique arrangement in providing a pair of indicating means, or primary and secondary scales. A first indicating means indicates the number of full revolutions of the operating means with respect to the body means, and the second indicating means indicates partial revolutions of the operating means with respect to the body means. With this arrangement, continuous fine adjustments may be obtained through considerable variations in position between the operating means and the body means thereby affording a greater degree of flow control than is possible with prior art arrangements while still maintaining a very accurate flow control and indication.

An object of the present invention is to provide new and novel flow regulating apparatus which is particularly adapted for use with flexible tubular members to control liquid flow therethrough.

Another object of the invention is the provision of flow regulating apparatus including means for accurately adjusting the flow rate to an associated tubular member in certain incremental steps.

Still another object of the invention is to provide flow regulating apparatus including indexing means for positively maintaining the apparatus in an adjusted position and to prevent accidental displacement of a desired setting.

Still a further object of the invention is the provision of flow regulating apparatus which enables a nurse to readily detect any tampering with a desired setting of the apparatus and which permits the apparatus to be reset to a previous setting without recalibrating the drop rate for a desired flow rate.

Yet another object of the invention is to provide flow regulating apparatus which eliminates the necessity of visual adjustment and wherein accurate changes can be made due to the provision of indexing means which can be detected by feel or audibly.

Still another object of the invention is to provide flow regulating apparatus which includes first and second indicating means one of which indicates full revolutions of the operating means with respect to the body means and the other of which indicates partial revolutions of the operating means with respect to the body means so as to provide continuous fine adjustments of the apparatus to considerable variations in position between the components thereof.

Other objects and many attendant advantages of the invention will become more apparent when considered in connection with the specification and accompanying drawings, wherein:

FIG. 1 is a top perspective view of an embodiment of the present invention;

FIG. 2 is a top view of the apparatus shown in FIG. 1;

FIG. 3 is a front view of the apparatus shown in FIG. 1;

FIG. 4 is a view similar to FIG. 3 illustrating the parts in exploded position;

FIG. 5 is a sectional view taken substantially along line 5—5 of FIG. 4 looking in the direction of the arrows;

FIG. 6 is a sectional view taken substantially along line 6—6 of FIG. 4 looking in the direction of the arrows; and FIG. 7 is an enlarged sectional view illustrating the manner in which the indexing rib of the body means cooperates with the indexing slots formed on the operating means.

Referring now to the drawings wherein like reference characters designate corresponding parts throughout the several views, the body means of the apparatus is indicated generally by reference numeral 10, and the movable operating means is indicated generally by reference numeral 12, each of these members being of an integral construction so as to provide a two-piece apparatus, and the members being formed of a suitable material preferably flexible in nature such as high density polyethylene or a similar plastic material.

The body means includes a main substantially flat body portion 16 terminating in two spaced upper arm portions 18 and 20, arm portion 18 being slightly wider than arm 20 as seen in FIG. 3 for a purpose hereinafter described. A portion 24 is formed integral and extends laterally from the main body portion 16 as seen most clearly in FIG. 1, portion 24 having a recessed area 26 formed therein which is in communication with a hole 28 formed through body portion 16. This hole and recess are adapted to receive a flexible tubular member 29 therethrough as illustrated in operative position in FIGS. 1, 2 and 3.

An integral wall portion 30 extends between spaced parts of the body portion 24, wall portion 32 having threads formed thereon, these threads extending through substantially 180°.

Spaced wall portions 34 and 36 as seen most clearly in FIG. 5 extend between spaced parts of the main body portion 16, these latter two wall portions having threads 38 and 40 formed thereon and extending through substantially 180°. It is apparent as seen in FIG. 5 that the threaded portions 38, 32 and 40 are disposed adjacent one another and cooperate to provide threads through 360° so as to threadably receive the operating means hereinafter described.

Arm portion 18 of the body means includes an integral laterally inwardly extending indexing rib 44 which is adapted to cooperate with the operating means hereinafter described. Arm 18 is also provided with an integral laterally extending indicator rib 46, which cooperates with the operating means in the manner hereinafter described.

As seen in FIG. 3, the body means is provided with additional indicating means in the form of a plurality of spaced visible indicating lines indicated generally by reference numeral 48 and identified as A, B and C. The purpose of these lines in cooperation with the operating means will be hereinafter described.

The operating means includes an elongated threaded shank 50 which is adapted to be threaded into the threads 32, 38 and 40 previously described on the body means, the lower end of shank portion 50 terminating in a tube engaging means 52 which may be rounded at the terminal end thereof and which is adapted to engage a flexible tubular member 29 as seen in FIG. 3 for partially or completely restricting the flow through the flexible tubular means so as to control the flow rate of liquid passing therethrough.

The operating means includes an enlarged upper end portion having a plurality of spaced ribs 56 formed about the outer periphery thereof, these ribs extending substantially parallel with the longitudinal axis of the operating means and being generally triangular shaped in cross-sectional configuration as seen most clearly in FIGS. 1 and 2. The top of the operating means is provided with a central cavity 58 which extends downwardly within the enlarged upper portion, and indicia indicated generally by reference numeral 60 and numbered 2 through 18 are provided as by embossing on the top surface of the operating means and about the cavity formed in the top thereof.

A peripherally extending laterally outwardly directed flange 64 is provided at the lower part of the enlarged upper portion of the operating means, this outwardly extending flange having a plurality of slots 66 formed therein in spaced portions around the periphery thereof. Each of the slots 66 is adapted to relatively snugly receive the indexing rib 44 formed on the body means.

In operation, the body means and the operating means are assembled in operative relationship, and a flexible tubular member is extended through the hole 28 and recess 26 in the body means. The operating means may be adjusted to a particular position wherein substantially no restriction of the flexible tubular member is obtained, and further whereby movement of the operating means downwardly from such position will result in progressive restriction of the flexible tubular member. For example, as seen in Fig. 3, the operating means is shown as having been moved downwardly to partially restrict flow of liquid through the flexible tubular member. It will be assumed that in its initial position wherein no restriction is applied the lower surface of the flange 64 on the operating means will be substantially aligned with the line C provided on the body means. This would indicate that the flow through the flexible tubular means would be substantially unrestricted. Upon rotation of the operating means in a particular direction, it will move downwardly from its initial position, and when the undersurface of the flange 64 is subsequently aligned with line B on the body means, it indicates that the operating means has moved through a complete revolution or 360° of movement which of course will result in a predetermined amount of movement of the tube engaging means downwardly so as to provide a predetermined amount of restriction in the flexible tubular means. Accordingly, this amount of movement of the operating means will provied a predetermined flow rate which enables operating personnel to accurately determine the amount of flow rate according to the amount of movement of the operating means.

In addition to the cooperating indicating means provided by the lines 48 on the body means and the flange portion of the operating means, a second indicating means is provided in the form of the indicating rib 46 provided on the body means, and the ribs 56 and indicia 60 provided on the operating means. It will be noted particularly as seen in FIG. 2 that the ribs and indicia of the operating means can be aligned with the indicator rib 46 on the body means so as to indicate accurately the partial revolutions of the operating means with respect to the body means. In this manner, a very fine adjustment of the operating means with respect to the body means may be obtained and the flow rate can be very accurately determined.

It will also be noted that in any particular adjusted position of the operating means with respect to the body means, the two components are maintained in such position by the indexing means including the indexing rib 44 which fits relatively snugly within one of the indexing slots 66 provided in the flange of the operating means. Accordingly, the operating means will remain in a particular adjusted relationship until it is positively moved into a new position. The interengagement between the indexing rib and the indexing slots provides the additional advantage of providing an audible indication of relative movement as well as a feel to the person utilizing the device so that it is not necessary to actually see the relative movement in order to determine the amount of rotation between the operating means and the body means.

It is apparent from the foregoing that there is provided according to the present invention new and novel flow regulating apparatus which is particularly adapted for use with flexible tubular members to control liquid flow therethrough. Means is provided for accurately adjusting the flow rate through the tubular member in certain incremental steps, and indexing or retaining means is provided for preventing accidental turning of the components relative to one another. The two sets of indicating means enable the aparatus to be reset to a previous setting from any position without recalibrating the drop rate for a desired flow rate thereby saving a nurse or personnel considerable time in adjusting the device. Additionally, a nurse can readily detect whether or not the desired setting has been tampered with. The indexing means provides an audible indication or a feel of the amount of relative turning such that it is not necessary to see the indicating means to determine the degree of relative rotation between the components. The provision of the dual indicating means gives a continuous fine adjustment through considerable variations so that a greater degree of flow control can be obtained.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly coopera-

I claim:

1. Flow regulating apparatus comprising body means defining an area for receiving a flexible tubular member, operating means movably supported by said body means and including tube engaging means in position to engage a flexible tubular member disposed within said area, the tube engaging means and the body means cooperating upon relative movement therebetween to adjustably control the amount of liquid flowing through a tubular member disposed within said area, said operating means being rotatably supported by said body means for reciprocating movement between the tube engaging means and the area, said body means including first and second indicating means formed thereon, said operating means including first and second indicating means thereon, the first indicating means on said body means comprising a plurality of spaced visible lines, the first indicating means on said operating means comprising a flange portion, said flange portion being adapted to be aligned with said lines upon relative rotation, reciprocation between the operating means and the body means to indicate the number of complete revolutions of movement between said operating means and said body means, the second indicating means on said body means comprising an indicator rib, the second indicator means on said operating means comprising indicating ribs and indicia, said second indicating means on said body means and said operating means being adapted to indicate partial revolutions of said operating means with respect to said body means.

2. Flow regulating apparatus comprising body means defining an area for receiving a flexible tubular member, operating means movably supported by said body means and including tube engaging means in position to engage a flexible tubular member disposed within said area, the tube engaging means and the body means cooperating upon relative movement therebetween to adjustably control the amount of liquid flowing through a tubular member disposed within said area, said operating means being rotatably supported by said body means for reciprocating movement between the tube engaging means and the area, said body means having formed thereon an indexing rib, said operating means having formed thereon a plurality of spaced slots each of which is adapted to receive said rib upon relative rotation between the operating means and the body means whereby interengagement between said rib and one of said slots holds the operating means in a particular adjusted position relative to said body means, said body means having first and second indicating means thereon, said operating means having first and second indicating means thereon, said first indicating means being adapted to indicate complete revolutions of said operating means with respect to said body means, and said second indicating means being adapted to indicate partial revolutions of said operating means with respect to said body means.

3. Apparatus as defined in claim 2 wherein said first indicating means on said body means comprises a plurality of spaced visible lines, the first indicating means on said operating means comprising a flange, said flange being adapted to be aligned with different ones of said lines for indicating a particular number of complete revolutions of said operating means with respect to said body means.

4. Apparatus as defined in claim 2 wherein the second indicating means on said body means comprises an indicator rib, the second indicating means on said operating means comprising a plurality of spaced ribs and indicia.

5. Flow regulating apparatus comprising a body means formed of resilient plastic material, said body means having a hole formed therein for receiving a flexible tubular member, operating means formed of flexible plastic material, said operating means including a threaded shank portion, said body means having spaced threaded portions for receiving said threaded shank portion, said operating means including tube engaging means at one end thereof and adapted to move adjacent said hole to engage a flexible tubular member disposed within the hole, the tube engaging means and the body means cooperating upon relative rotation and reciprocation of the operating means with the body means to adjustably control the amount of liquid flowing through the tubular member extending through said hole, the upper portion of said body means including a pair of spaced arms, the upper portion of said operating means including an enlarged portion positioned between said arms, one of said arms of the body means having formed thereon a laterally extending integral indicator rib, one of said arms having an integral laterally extending indexing rib formed thereon, one of said arms having visible indicating means thereon, said enlarged upper portion of the operating means having an outwardly directed flange at the lower portion thereof, said flange having a plurality of spaced slots formed in the outer edge thereof, said slots being adapted to receive said indexing rib, said enlarged upper portion also including a plurality of ribs formed thereabout and having indicia at the upper portion thereof for cooperating with the indicator rib to indicate partial revolutions of said operating means with respect to said body means, the flange on said enlarged upper portion of the operating means also cooperating with the visible lines formed on said body means for indicating complete revolutions of said operating means with respect to said body means.

References Cited

UNITED STATES PATENTS

| 1,746,055 | 2/1930 | Roberts et al. |
| 2,780,328 | 2/1957 | Yoder. |
| 2,838,066 | 6/1958 | Harris. |
| 2,969,549 | 1/1961 | Mills. |
| 3,042,067 | 7/1962 | Hidding. |

M. CARY NELSON, *Primary Examiner.*

HENRY T. KLINKSIEK, *Assistant Examiner.*